US012611066B2

(12) United States Patent
Ruggiero

(10) Patent No.: US 12,611,066 B2
(45) Date of Patent: Apr. 28, 2026

(54) BLENDER FOOD ITEM TEXTURE CONTROL

(71) Applicant: SharkNinja Operating LLC, Needham, MA (US)

(72) Inventor: Glen Harrison Ruggiero, Charlestown, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/208,100

(22) Filed: Jun. 9, 2023

(65) Prior Publication Data

US 2024/0407605 A1     Dec. 12, 2024

Related U.S. Application Data

(63) Continuation of application No. 18/207,935, filed on Jun. 9, 2023.

(51) Int. Cl.
   *A47J 43/00*        (2006.01)
   *A47J 43/046*      (2006.01)
   *A47J 43/08*       (2006.01)
   *A47J 43/07*       (2006.01)

(52) U.S. Cl.
   CPC .......... *A47J 43/085* (2013.01); *A47J 43/046* (2013.01); *A47J 2043/0733* (2013.01)

(58) Field of Classification Search
   CPC ................................................... A47J 43/046
   See application file for complete search history.

(56) References Cited

U.S. PATENT DOCUMENTS

| | | | |
|---|---|---|---|
| 8,485,715 | B1 | 7/2013 | Bohannon, Jr. |
| 9,386,882 | B2 | 7/2016 | Farrell et al. |
| 9,420,917 | B2 | 8/2016 | Farrell et al. |
| 9,579,615 | B2 | 2/2017 | Farrell et al. |
| 9,675,211 | B2 | 6/2017 | Lehotay |

(Continued)

FOREIGN PATENT DOCUMENTS

| | | |
|---|---|---|
| CN | 101491417 | 2/2013 |
| CN | 106774518 | 5/2017 |

(Continued)

OTHER PUBLICATIONS

Extended European Search Report in EP Application No. 23189881.8 dated Dec. 7, 2023, 8 pages.

(Continued)

*Primary Examiner* — Steven N Leff
(74) *Attorney, Agent, or Firm* — The Webb Law Firm

(57) ABSTRACT

A food processor includes a controllable component coupled to components of the food processor and configured to process one or more food items during a first time period. A monitoring device is configured to detect a property associated with the processing of the one or more food items during the first period of time and output a first series of detection signals over the first time period, which correspond to at least one property of the food item being processed. A memory is configured to store a plurality of food item vectors in a multi-dimensional feature space, each of which are associated with a type of food item. A controller is configured to control operations of the controllable component based on the detection signals t.

20 Claims, 7 Drawing Sheets

(56) References Cited

U.S. PATENT DOCUMENTS

| | | | |
|---|---|---|---|
| 9,943,190 B2 | 4/2018 | Golino | |
| 9,999,320 B2 | 6/2018 | Dickson, Jr. | |
| 10,058,217 B2 | 8/2018 | Le | |
| 10,105,002 B2 | 10/2018 | Grassia | |
| 10,111,558 B2 | 10/2018 | Dickson, Jr. | |
| 10,136,763 B2 | 11/2018 | Heijman | |
| 10,166,516 B2 | 1/2019 | Xiang | |
| 10,201,790 B2 | 2/2019 | Hoare | |
| 10,219,645 B2 | 3/2019 | Maier | |
| 10,291,172 B2 | 5/2019 | Barfus | |
| 10,327,593 B2 | 6/2019 | Laffi | |
| 10,517,434 B2 | 12/2019 | Lammers | |
| 10,638,886 B2 | 5/2020 | Kolar | |
| 10,749,342 B2 | 8/2020 | Geng | |
| 10,888,869 B2 | 1/2021 | Abbiati | |
| 10,931,765 B2 | 2/2021 | Ciepiel | |
| 11,039,715 B2 | 6/2021 | Huerta-Ochoa | |
| 11,052,360 B2 | 7/2021 | Bird | |
| 11,061,419 B1 | 7/2021 | Wallace | |
| 11,109,713 B2 | 9/2021 | Frielinghaus | |
| 11,213,171 B2 | 1/2022 | Falkner-Edwards | |
| 11,241,118 B2 | 2/2022 | Yan | |
| 11,344,159 B2 | 5/2022 | Mosebach | |
| 11,460,453 B2 * | 10/2022 | Sakai | G01N 30/86 |
| 2006/0131452 A1 | 6/2006 | Caldewey | |
| 2007/0273311 A1 | 11/2007 | Guinet et al. | |
| 2009/0158941 A1 | 6/2009 | Lee et al. | |
| 2017/0221322 A1 | 8/2017 | Ignomirello | |
| 2018/0054142 A1 | 2/2018 | Williams | |
| 2018/0333007 A1 | 11/2018 | Ganahl | |
| 2019/0001288 A1 * | 1/2019 | Ciepiel | B01F 35/2209 |
| 2019/0238082 A1 | 8/2019 | Zhao | |
| 2019/0320850 A1 | 10/2019 | Chen | |
| 2020/0103893 A1 * | 4/2020 | Cella | G06N 3/044 |
| 2020/0154945 A1 | 5/2020 | Montoya et al. | |
| 2020/0187706 A1 | 6/2020 | Rossetto | |
| 2020/0229647 A1 | 7/2020 | Hack et al. | |
| 2020/0267996 A1 * | 8/2020 | Stork Genannt Wersborg | F24C 15/008 |
| 2020/0282372 A1 | 9/2020 | Liu | |
| 2021/0022555 A1 | 1/2021 | Atinaja | |
| 2021/0059474 A1 | 3/2021 | Kwan | |
| 2021/0152649 A1 | 5/2021 | Ciepiel | |
| 2021/0259460 A1 | 8/2021 | Siu | |
| 2021/0302928 A1 | 9/2021 | Frielinghaus | |
| 2022/0007894 A1 | 1/2022 | Thies | |
| 2022/0173676 A1 | 6/2022 | Purfuerst | |
| 2022/0175194 A1 | 6/2022 | Antkowiak et al. | |
| 2022/0202255 A1 | 6/2022 | Park | |
| 2022/0322885 A1 | 10/2022 | Park et al. | |
| 2022/0400903 A1 | 12/2022 | Kang et al. | |

FOREIGN PATENT DOCUMENTS

| | | | | |
|---|---|---|---|---|
| CN | 107198470 | 9/2017 | | |
| CN | 206761570 | 12/2017 | | |
| CN | 108497952 | 9/2018 | | |
| CN | 109222691 | 1/2019 | | |
| CN | 208447356 | 2/2019 | | |
| CN | 209091032 | 7/2019 | | |
| CN | 209285247 | 8/2019 | | |
| CN | 110236418 | 9/2019 | | |
| CN | 110799075 | 2/2020 | | |
| CN | 211985144 | 11/2020 | | |
| CN | 113141032 | 7/2021 | | |
| CN | 214631789 | 11/2021 | | |
| CN | 215298037 | 12/2021 | | |
| CN | 114129073 | 3/2022 | | |
| CN | 114557614 | 5/2022 | | |
| CN | 111759192 | 6/2022 | | |
| CN | 114631745 | 6/2022 | | |
| CN | 110051240 | 7/2022 | | |
| CN | 114854522 | 8/2022 | | |
| EP | 1703829 | 9/2006 | | |
| EP | 3463019 | 4/2019 | | |
| EP | 3632275 | 4/2020 | | |
| WO | 2017013155 | 1/2017 | | |
| WO | 2017203237 | 11/2017 | | |
| WO | WO-2019070629 A2 * | 4/2019 | | A47J 43/042 |
| WO | 2019115421 | 6/2019 | | |
| WO | 2020183217 | 9/2020 | | |
| WO | 2021029605 | 2/2021 | | |
| WO | 2021204824 | 10/2021 | | |

OTHER PUBLICATIONS

International Search Report and Written Opinion in Application No. PCT/US2023/027758 dated Jan. 30, 2024, 11 pages.

* cited by examiner

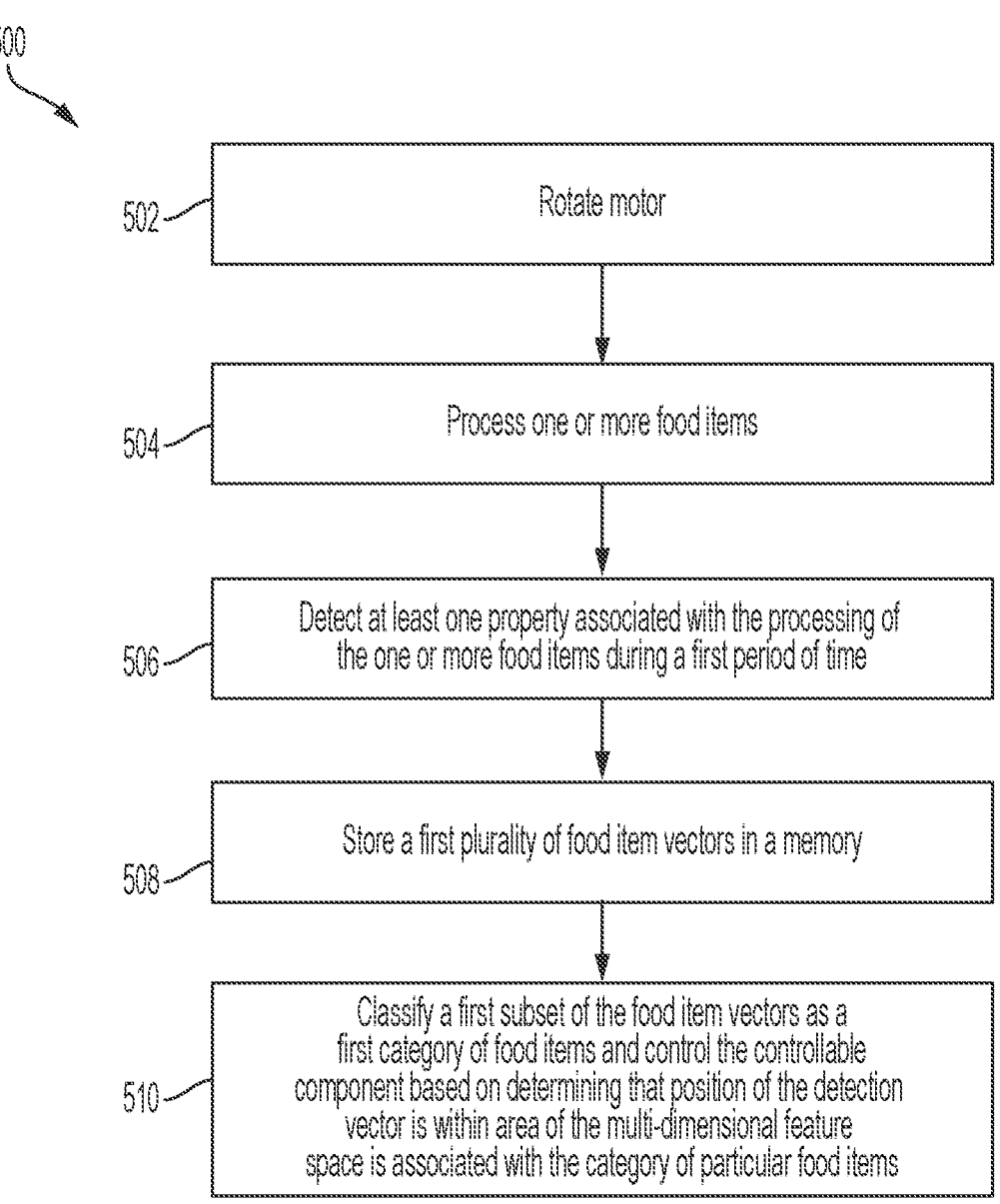

500

502 — Rotate motor

504 — Process one or more food items

506 — Detect at least one property associated with the processing of the one or more food items during a first period of time 508 — Store a first plurality of food item vectors in a memory 510 — Classify a first subset of the food item vectors as a first category of food items and control the controllable component based on determining that position of the detection vector is within area of the multi-dimensional feature space is associated with the category of particular food items

FIG. 5

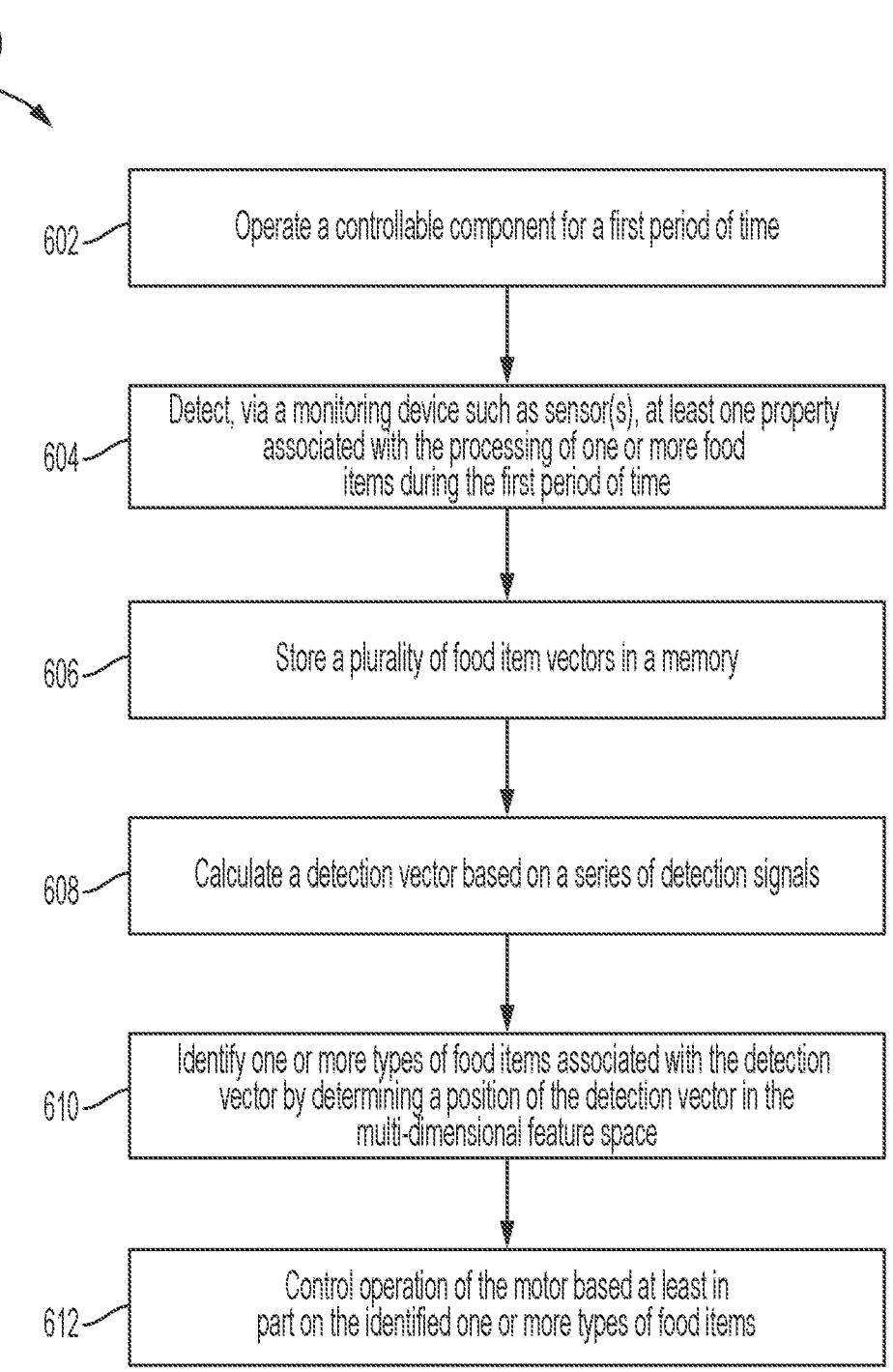

600

602 — Operate a controllable component for a first period of time

604 — Detect, via a monitoring device such as sensor(s), at least one property associated with the processing of one or more food items during the first period of time 606 — Store a plurality of food item vectors in a memory 608 — Calculate a detection vector based on a series of detection signals 610 — Identify one or more types of food items associated with the detection vector by determining a position of the detection vector in the multi-dimensional feature space 612 — Control operation of the motor based at least in part on the identified one or more types of food items

FIG. 6

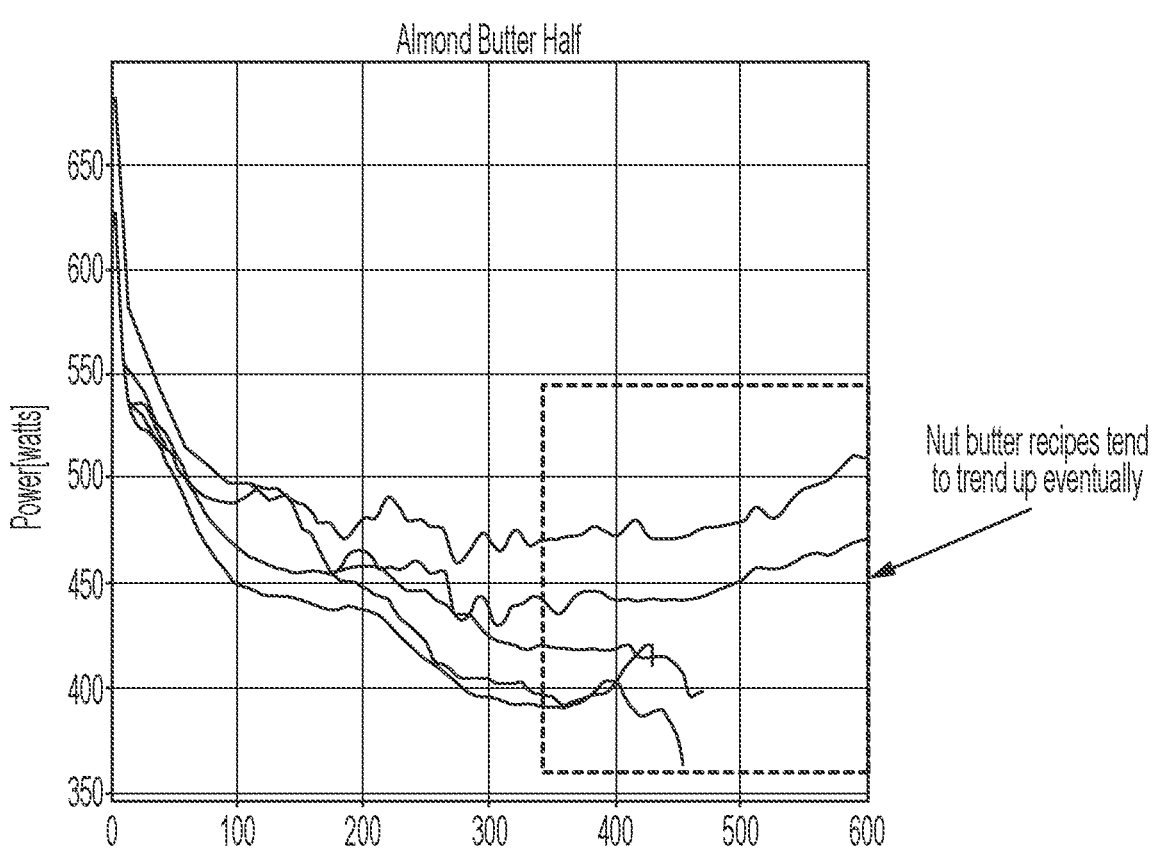
FIG. 7

BLENDER FOOD ITEM TEXTURE CONTROL

CROSS REFERENCE TO RELATED APPLICATIONS

The present application claims the benefit of nonprovisional application Ser. No. 18/207,935, filed Jun. 9, 2023.

TECHNICAL FIELD

This specification describes example implementations related to blenders and, more particularly, and implementations including controlling the texture of food items being processed by blenders.

BACKGROUND

As used herein, a "food processor" is not limited to being a specific type of small appliance commonly referred to as a food processor, but rather, is a kitchen and/or laboratory appliance used to blend, mix, crush, purée, chop, grind, cut, comminute and/or emulsify food, beverages and other substances, for example, during one or more cycles, and may include, but is not limited to, a blender, a mixer, a juicer, a grinder, a frother, a micro puree machine, other types of devices for processing food, and any suitable combination of the foregoing. A food processor may include a container with a rotating blade powered by a motor. Current blenders may include a microprocessor configured to control operations of the blender related to processing food items to create blended food items such as smoothies, ice creams, or whipped cream. Existing blenders may include computer-controlled programs or recipes that implement particular operational sequences of the motor and mixing blades that are specific to particular food items. Unfortunately, such operational sequences are typically fixed and do not account for different conditions or consistencies of food item ingredients being processed, leading to variable and inconsistent outcomes in the characteristics of processed food items. Accordingly, there is a need for more adaptable processing of food items to ensure more consistent and accurate food item outcome conditions, such as an expected texture of the food item being processed.

SUMMARY

The application, in various implementations, addresses deficiencies associated with more accurately and consistently blending food items.

This application describes illustrative systems, methods, and devices that enable a blender to detect the values of physical properties (e.g., sense conditions) associated with processing a food item, analyze the values, and determine how to further process the food item based on the analyzed values. For example, various blending ingredients to create a smoothie (e.g., the blended ingredients constituting a food item) may be added to a blender container. The blender may receive an input from a user via a user interface to process the ingredients, which may include executing a predefined processing sequence for a smoothie. A microcontroller may then control execution of the processing, including executing computer program instructions, to automatically process the ingredients, for example, according to the predefined processing sequence. During a period when processing the ingredients, i.e., mixing the ingredients, the microcontroller may receive a series of motor signals based on power consumption of the motor sensed by one or more sensors, analyze the motor signals and, based on this analysis, adjust processing of the blending ingredients, e.g., to realize a desired and/or expected condition for the blended ingredients, e.g., a desired and/or expected texture for a smoothie. The microcontroller may utilize machine learning (ML) and/or artificial intelligence (AI) techniques to more adaptively and accurately analyze the detected values and control production of a desired and/or expected condition for the blended ingredients. The microprocessor may analyze other electronic signals such as, without limitation, temperature of a mixing vessel or current signals associated with a heating element and based on one or more of those signals and/or the motor signals, adjust processing of the blending ingredients.

In one aspect, a food processor is disclosed. The food processor may include a motor coupled to a drive shaft and configured to rotate the drive shaft. The food processor may further include a blade assembly coupled to the drive shaft. The blade assembly may be configured to process a food item while being rotated by the drive shaft. The food processor may include other processing components including one or more heating elements. One or more processing components of the food processor may be controllable by a controller of the food processor, for example, a motor or heating element, and may be referred to herein as controllable components. While several implementations are described herein using the example of a motor as the controllable component, it should be appreciated that the invention is not so limited, and other controllable components may be used in certain implementations, in addition to or as an alternative to a motor.

The food processor may further include a monitoring device configured to detect values of one or more physical properties associated with processing food items, for example, at least one of a current and voltage associated with operation of the motor, over a first time period, and output a first series of signals representing the values over the first time period. The food processor may include a memory configured to store a plurality of known food item vectors in a multi-dimensional feature space. Each of the plurality of known food item vectors may be associated with a type of food item. The food processor may further include a controller (e.g., microprocessor) configured to control operations of the motor. Several implementations are described herein using the example of a microprocessor as the controller, but the invention is not so limited. Other types of controllers can be used.

In some implementations, a microprocessor of the food processor may receive a first series of motor signals, determine values of one or more predefined features based on the motor signals, and construct a vector of these determined values (i.e., a detection vector) as described in more details elsewhere herein. The microprocessor may further compare a position of the detection vector with the positions of the plurality of known food item vectors in the multi-dimensional feature space, each food item vector corresponding to a respective food item. The microprocessor may further identify one or more types of food items associated with food item being processed, represented by the detection vector, by determining which one or more of the plurality of known food item vectors is closest to the detection vector in the multi-dimensional feature space.

The microprocessor then may control the execution of one or more actions based on the determination of the closest one or more food item vectors. In one implementation, the microprocessor, based on the identified food item, continues to rotate the motor for a second period of time. The second period of time may be between 0 seconds and 30 seconds. In some implementations, the second period of time is 15 seconds.

In one implementation, the first period of time is 15 seconds. In some implementations, the comparison and identifying of the food item is based on a K-NN classification. According to another implementation, the monitoring device may include at least one of a current sensor and voltage sensor.

In one implementation, the type of food item includes one of a apple-peanut-butter, beat-ginger-smoothie, chocolate-peanut-butter-oat, maple-almond-butter, cinnamon-coffee-smoothie, citrus smoothie, essentially green smoothie, triple-green smoothie, tropical smoothie, smoothie of any type, extract, sauce, ice cream, pudding, nut butter, whip cream, margarita, pomegranate-cashew berry, strawberry-banana, strawberry-limeade, and a frozen drink. In some implementations, each of the features are selected from the group including: a peak in a plot of a time series pattern and/or data, a drop in a plot of the time series data, a standard deviation of a plot of the series data, and a steady state power consumption in a plot of the time series data, a standard deviation of the time series data (which as described herein represents a detected property value over a period of time) or a subset of the time series data (i.e., for values detected during a subset of the time period); an average value of the time series data or subset thereof; a value at a particular point in time during the period of time represented by the time series data; a difference between a value at a first point in time and a value at a second point in time during the period of time represented by the time series data; a momentum of the data represented by the time series data or a subset thereof; a gradient of a curve representing the time series data or a subset thereof; other features; or any suitable combination of the foregoing.

In one aspect, a food processor includes a controllable component coupled to one or more components configured to process one or more food items. The food processor also includes a monitoring device configured to detect at least one property associated with the processing of the one or more food items during a first period of time, where a first series of detection signals are generated from the at least one property detected over the first period of time. A memory is configured to store a first plurality of food item vectors, where each food item vector defines values for a plurality of features in a multi-dimensional feature space and each of the first plurality of food item vectors is associated with a type of food item. A controller is configured to control operations of the controllable component. The controller receives the first series of detection signals and calculates a detection vector based on the first series of detection signals. The detection vector defines feature values for a plurality of features in the multi-dimensional feature space. The controller identifies one or more types of food items associated with the detection vector by determining a position of the detection vector in the multi-dimensional feature space relative to positions of one or more of the first plurality of food item vectors, respectively, in the multi-dimensional feature space. The controller then determines one or more actions based at least in part on the identified one or more types of food items and controls operation of the controllable component based at least in part on the determined one or more actions.

The controller, based on the identified one or more types of food items, may continue to operate the controllable component for a second period of time. The controllable component may include a motor and the operating the motor may include rotating the motor. The controller may identify the food item based, at least in part, on performing a K-NN analysis. The monitoring device may include a current sensor, voltage sensor, motor speed sensor, pressure sensor, and/or temperature sensor.

The controller may calculate and/or generate a detection vector by calculating the one or more feature values defining the detection vector. A first of the one or more feature values may include a gradient of a curve defined by the first series of detection signals. The controller may detect the at least one property associated with processing the one or more food items during a first period of time by detecting at least one of a current and voltage associated with operation of the controllable component over the first time period. The controller may detect at least one property associated with the processing of the one or more food items by determining a type and/or size of the one or more components. The controller may be configured to control the controllable component based at least in part on the type and/or size of one of the components.

The controller may be configured to identify the one or more types of food items associated with the detection vector by determining which one of the first plurality of food item vectors is closest to the detection vector in the multi-dimensional feature space. The controller may be configured to identify the one or more types of food items associated with the detection vector by determining the position of the detection vector in the multi-dimensional feature space with respect to positions of two or more of the first plurality of food item vectors in the multi-dimensional feature space.

The controller may be configured to control the operation of the controllable component based on applying a weight factor to each of the two or more of the first plurality of food item vectors, where the weight factor is based on a distance of a food item vector from the detection vector, a frequency of determining a type of food item, and/or a type of container used during food processing. The controller may be configured to classify a first subset of the one or more food item vectors as a first category of food items and control the controllable component based at least in part on determining that the position of the detection vector in the multi-dimensional feature space is within a first area of the multi-dimensional feature space associated with the first category of food items.

The controller may classify a first subset of the one or more food item vectors as a first category of food items based on the detection vector and control the controllable component based at least in part on determining that the position of the detection vector in the multi-dimensional feature space is within a first area of the multi-dimensional feature space associated with the classification of the first category of food items. The controller may be configured to classify a second subset of the one or more food items vectors as a second category of food items; and control the controllable component based at least in part on determining that the position of the detection vector in the multi-dimensional feature space is within a second area of the multi-dimensional feature space associated with the second category of food items Each of the features may include a peak value detected for the at least one property in the first series of signals, a drop between values detected for the at least one property in the first series of signals, a standard deviation of values detected for the at least one property in the first series of signals, and/or a value detected for the at least one property at a particular point in time in the first series of signals.

Another aspect includes a method for processing food items via a controllable component configured to process one or more food items including: operating the controllable component for a first period of time; detecting, via a monitoring device, at least one property associated with the processing of the one or more food items during the first period of time, where a first series of detection signals are generated from the at least one property detected over the first period of time; storing, in a memory, a first plurality of food item vectors, each food item vector defining values for a plurality of features in a multi-dimensional feature space, each of the first plurality of food item vectors being associated with a type of food item; calculating a detection vector based on the first series of detection signals, where the detection vector defines feature values for a plurality of features in the multi-dimensional feature space; identifying one or more types of food items associated with the detection vector by determining a position of the detection vector in the multi-dimensional feature space relative to positions of one or more of the first plurality of food item vectors, respectively, in the multi-dimensional feature space; determining one or more actions based at least in part on the identified one or more types of food items; and controlling operation of the controllable component based at least in part on the determined one or more actions.

The method may include continuing to operate the controllable component for a second period of time based on the identified one or more types of food items. The controllable component may include a motor where operating the motor includes rotating the motor. Identifying the food item may be based, at least in part, on performing a K-NN analysis. Identifying the one or more types of food items associated with the detection vector may include determining which one of the first plurality of food item vectors is closest to the detection vector in the multi-dimensional feature space.

In a further aspect, a non-transitory computer-readable storage medium storing instructions including a plurality of food processing instructions associated with a food processing sequence which when executed by a computer cause the computer to perform a method for processing food items using a food processor via a controllable component configured to process one or more food items, where the method includes: operating the controllable component for a first period of time; detecting, via a monitoring device, at least one property associated with the processing of the one or more food items during the first period of time, where a first series of detection signals are generated from the at least one property detected over the first period of time; storing, in a memory, a first plurality of food item vectors, where each food item vector defines values for a plurality of features in a multi-dimensional feature space, each of the first plurality of food item vectors being associated with a type of food item; calculating a detection vector based on the first series of detection signals, the detection vector defining feature values for a plurality of features in the multi-dimensional feature space; identifying one or more types of food items associated with the detection vector by determining a position of the detection vector in the multi-dimensional feature space relative to positions of one or more of the first plurality of food item vectors, respectively, in the multi-dimensional feature space; determining one or more actions based at least in part on the identified one or more types of food items; and controlling operation of the controllable component based at least in part on the determined one or more actions.

Any two or more of the features described in this specification, including in this summary section, may be combined to form implementations not specifically described in this specification.

At least part of the systems and processes described in this specification may be configured or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the test systems and processes described in this specification may be configured or controlled using a computing system comprised of one or more processing devices and memory storing instructions that are executable by the one or more processing devices to perform various control operations.

The details of one or more implementations are set forth in the accompanying drawings and the following description. Other features and advantages will be apparent from the description and drawings, and from the claims.

DESCRIPTION OF THE DRAWINGS

FIG. 5 is flowchart showing an example of a process for monitoring, analyzing, and performing one or more actions within the food processor of FIG. 1, according to some implementations;

FIG. 6 is flowchart showing food processing via a controllable component configured to process one or more food items, according to some implementations; and FIG. 7 is a graph showing example detected increasing trends of power load to confirm that a food item being processed is or is not a particular classification of food item, according to some implementations; Like reference numerals in different Figures indicate like elements.

DETAILED DESCRIPTION

The application, in various implementations, addresses deficiencies associated with blending one or more food items. The application includes illustrative devices, systems, and methods that enable efficient and reliable sensory features regarding the state of a food processor, such as a blender.

This application describes illustrative systems, methods, and devices that enable a blender to sense conditions associated with processing a food item and determine when the food item satisfies expected characteristics of a processed outcome of the food item. These example methods, devices, and systems may have advantages in dynamically sensing cavitation and solidification of blending ingredients in areas of the blending jar remote from the blade configuration at the bottom of the blending jar. For example, some implementations can work by sensing features from a blender within the first 15 seconds, and then identifying which data points are closest in distance. Based on which points are closest, example processes can then calculate a weighted average of the times that can be used for the program time based on what is being blended.

Figure 1:
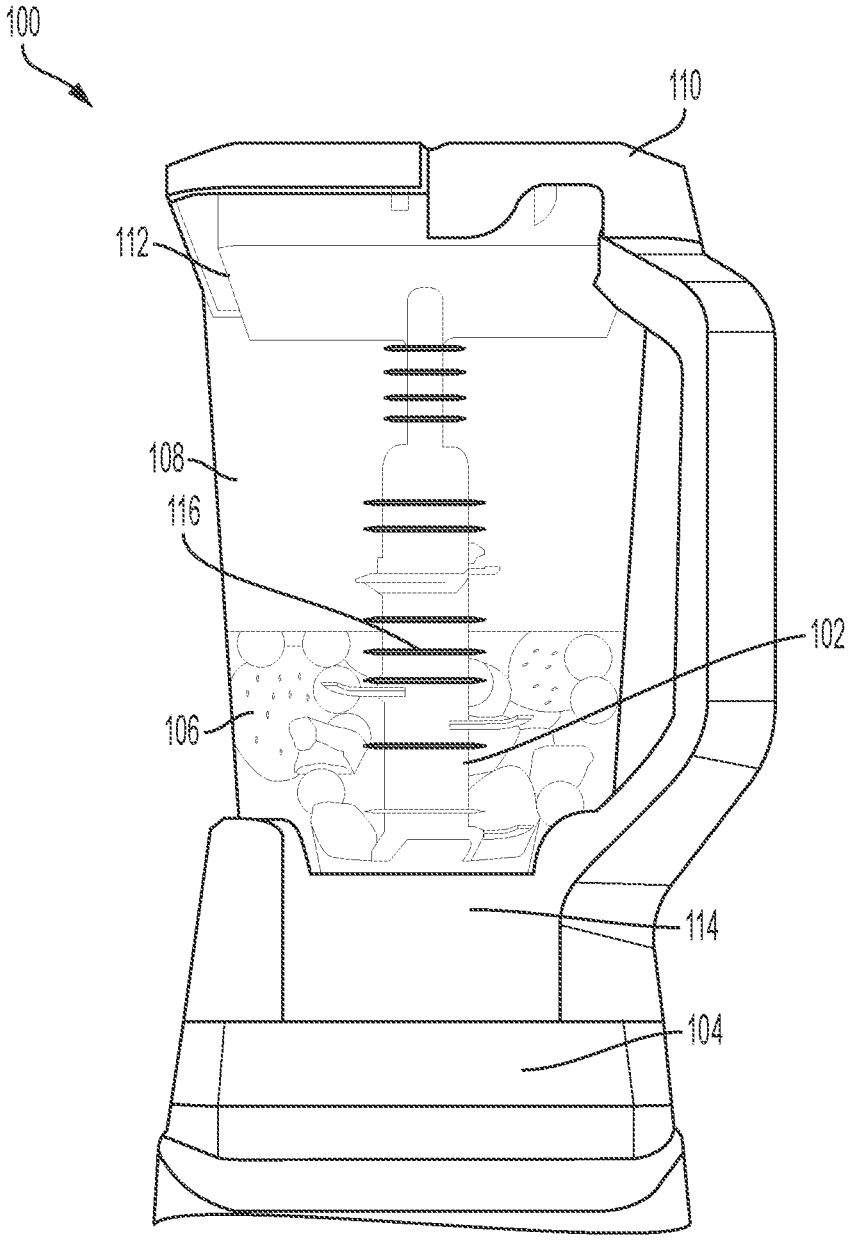
FIG. 1 is a perspective view of an example food processor, according to some implementations.

FIG. 1 is an example of a blender, a type of food processor, 100. While implementations are described herein using the example of a blender, it should be appreciated that the invention is not so limited, and applies to other types of food processors. In some implementations, the blender 100 includes a motorized base 104 and a blending container and/or jar 108. In use, the blending jar or container 108 can fit into a recess (not shown) formed in the base 104. The blending jar 108 includes a removable lid 110 that fits into an open top 112 of the blending jar 108. The blending jar 108 can thereby be filled with one or more food items, such as fruit ingredients 106. One or more food items, as described herein, can include and/or refer to any organic substance containing nutrients, such as carbohydrates, proteins, and fats, that can be ingested by a living organism and metabolized into energy and body tissue. The base 104 includes an electrical motor, e.g., motor 214 of FIG. 2, for providing rotary power to a blade assembly 102 disposed within the blending jar 108. In some implementations, the motor is coupled to a drive shaft 116 and configured to rotate the drive shaft 116. The blade assembly 102 may also be coupled to the drive shaft 116, and can be configured to process food ingredients, such as fruit ingredients 106, while being rotated by the drive shaft 116. The blade assembly 102 is a type of blade assembly that may be referred to as a stacked blade. Other types of blade assemblies, for example, a more traditional bottom blade assembly, which may rotate at higher speeds than a stacked blade assembly (e.g., a high-speed bottom blade (HSBB) blade assembly), may be used.

The blender 100 may be considered a traditional type of blender, which has a removable lid 110 at the top end of the blender jar 108 into which ingredients may be added to the blender jar 108, where the blender jar 108 is coupled at its bottom end to the motorized base 104. However, other types of blenders may be used, for example, a single-serve blender, which has a smaller capacity than a traditional blender, and may have a lid or cap including a blade assembly at an end of the blender jar (i.e., container or cup) through which ingredients are introduced into the blender jar before coupling the cap to it, where the blending assembly including the blender jar coupled with the cap including the blade assembly then may be flipped to couple the cap to the blending base.

Figure 2:
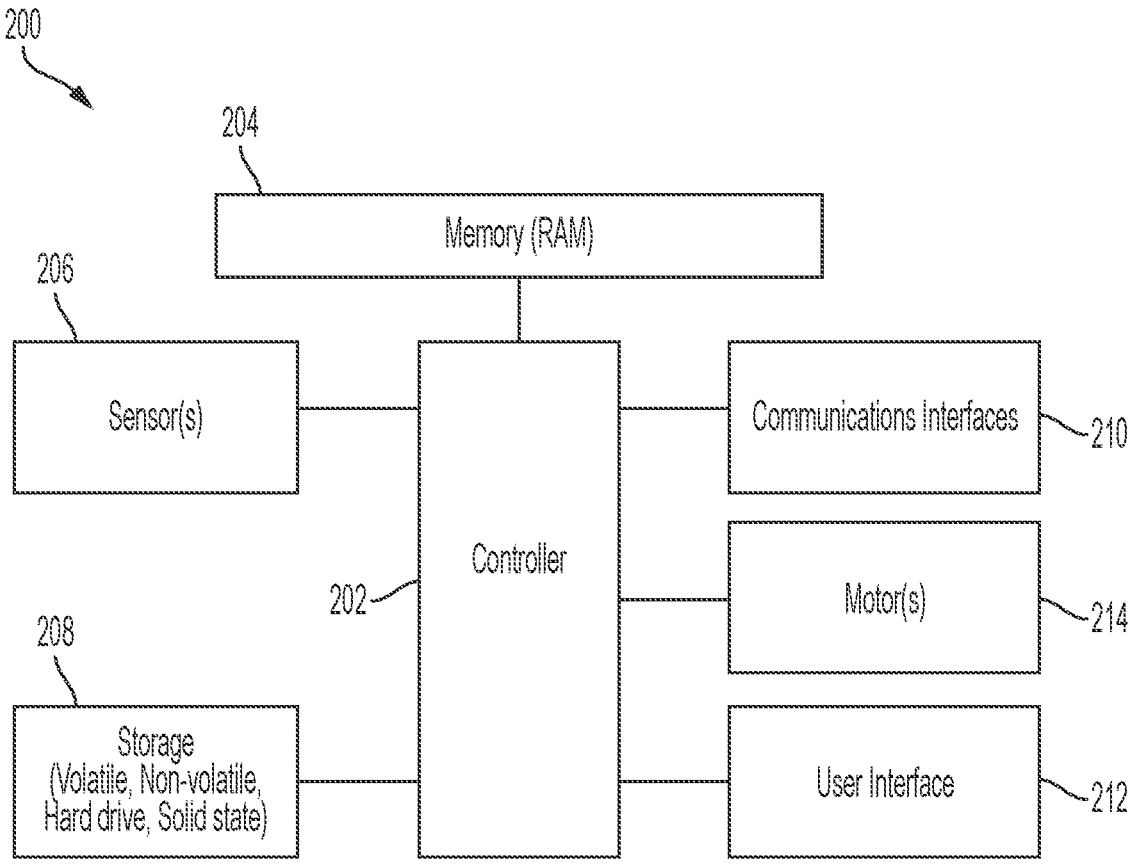
FIG. 2 is a block diagram of an example of a system architecture within the food processor of FIG. 1, according to some implementations.

Electronic controls, such as user interface 212 of FIG. 2, can control electrical power to the motor 214 which in an implementation may include one or more switches for controlling the motor 214 at various speeds including "off", "low", "medium" and "high". In some implementations of FIG. 1, the electronic controls of food processor 100 may include a controller and/or microprocessor, such as controller 202 of FIG. 2, with memory storing pre-programmed and/or dynamic routines for controlling the motor 214. This controller 202 may be configured to receive the first series of motor signals, determine a power consumption time-series pattern of the motor 214 over the first time period, identify a plurality of time-series pattern features associated with the time-series pattern, calculate a detection vector based on the plurality of time-series pattern features, compare a position of the detection vector with the positions of the plurality of known food item vectors in the multi-dimensional feature space, and/or identify a food item (e.g., nut butter or a smoothie drink) associated with the detection vector by determining which one of the plurality of known food item vectors is closest to the detection vector in the multi-dimensional feature space.

FIG. 1 may also include a monitoring device, such as sensor(s) 206 of FIG. 2, as part of food processor 100, which can be configured to detect one or more physical properties associated with processing food items, for example, detect at least one of a current and voltage associated with operation of the motor, i.e., controllable component, over a first time period and output a first series of motor signals, i.e., detection signals, over the first time period. For example, the first series of motor signals may correspond to at least one property of the food item being processed. Additionally, food processor 100 may include a memory, such as memory (RAM) 204 of FIG. 2, configured to store a plurality of known food item vectors in a multi-dimensional feature space, each of the plurality of known food item vectors being associated with a type of food item. The blade assembly 102 can be inserted into an opening on the bottom end 114 of the blending jar 108 and secured therein. For example, blade assembly 102 can be secured by internal threads that engage complementary threads around the bottom end 114 of the blending jar 108.

In some implementations of FIG. 1, the controller 202, based on the identified food item derived from mixing ingredients 106, continues to rotate, i.e., operate, the motor for a second period of time. In some implementations, the second period of time is between 0 seconds and 30 seconds. More specifically, the second period of time in which the controller 202, based on the identified food item, continues to rotate the motor for a second period of time, can be 15 seconds. The first period of time in which the controller 202 determines a power consumption time-series pattern of the motor 204 can also be 15 seconds. In some implementations of FIG. 1, the comparison and identifying of the food item can be based on a K-NN classification. The first and/or second periods of time may be of other durations.

In some implementations of FIG. 1, the monitoring device 206 includes at least one of a current sensor and voltage sensor. In some implementations, the type of food item derived from ingredients 106 includes one of a smoothie, extract, sauce, ice cream, pudding, nut butter, whip cream, a frozen drink, another type of food item, or any suitable combination of the foregoing. It should be noted that the values of one or more physical properties associated with the processing of a food item, for example, physical properties of food item derived from ingredients 106 and/or blending jar 108 within blender 100 may be detected over time, and represented as time series data and/or a time series pattern based on the physical property values. In some instances, the value of a static physical property associated with the processing of a food item, for example, the capacity of the blending jar 108, is also detected, and such value can be used as part of further processing as described elsewhere herein.

In some implementations, values for a plurality of features can be generated based on the time series data, and these feature values can be represented as a detection vector. As described in more detail elsewhere herein, such features may include: a standard deviation of the time series data (which as described herein represents a detected property value over a period of time) or a subset of the time series data (i.e., for values detected during a subset of the time period); an average value of the time series data or subset thereof; a value at a particular point in time during the period of time represented by the time series; a difference between a value at a first point in time and a value at a second point in time during the period of time represented by the time series data; a momentum of the data represented by the time series data data or a subset thereof; a gradient of a curve representing the time series data data or a subset thereof; other features; or any suitable combination of the foregoing.

In some implementations, a detected food item is initially classified as a class of food item based on the time series data, for example, based on one or more feature values determined therefrom; and the subsequent processing of the time series data and/or feature values is based on this initial classification, as described in more detail elsewhere herein. For example, the controller 202 can initially classify a food item as being a type of nut butter, or a type of dough, in which case subsequent processing is handled in certain way; whereas if the food item is initially classified as a food item that is not a type of nut butter or type of dough, subsequent processing is handled in a different way. In some implementations, controller 202 classifies a first subset of food item vectors as a first category of food items and controls the controllable component, e.g., motor, based at least in part on determining that the position of the detection vector in the multi-dimensional feature space is within a first area of the multi-dimensional feature space associated with the first category of food items. For example, various types of nut butter may be members of the first subset of food item vectors and, therefore, have their food item vectors in the first area of the multi-dimensional feature space, while non-nut butter food items and/or frozen drink food items may be members of a second subset of food item vectors and, therefore, have their food item vectors in a second area of the multi-dimensional feature space. The classification of a detected food item and the subsequent processing may employ any of a variety of known or later developed techniques, and may employ one or more known or later developed technologies to implement such techniques, for example, using any of a variety of ML and/or neural networks.

The controller 202 can be further configured to determine one or more closest food types to the detected food item based on determined feature values. For example, this determination can include the selection of a subset of multi-dimensional feature vectors based on a determined capacity of the blending jar 108 (e.g., a data sets for 28-ounce or 64-ounce capacity) and comparing the detection vector against the subset of multi-dimensional feature vectors. In some instances, each such feature vector represents and/or is otherwise associated with a food type, such as a margarita, type of smoothie and/or another type of food item, and such vectors may be referred to herein as "food item vectors." Such comparison may include determining which one or more food item vectors are closest in the multi-dimensional feature space to the detection vector, e.g., who are the nearest neighbors. This determination may use any of a variety of known or later developed techniques, for example, a K-Nearest Neighbors Algorithm (KNN), and may employ one or more known or later developed technologies to implement such techniques, for example, any of a variety of neural networks. For example, controller 202 can identify the food type associated with the detection vector as being a particular type of beverage, juice, frozen beverage, smoothie, butter, shake, cream, sauce, soup, frosting, whipped topping, other type of food, or any suitable combination of the foregoing.

Controller 202 can then determine additional controller 202 actions based on determine one or more closest food types, for example, add additional blending time for the detected food time. For example, an additional blending time may be associated with each food item vector, and the additional time for the detected food item may be determined by calculating a combined (e.g., weighted average) of the additional blending times associated with the determined one or more closest food items. For example, for each of the one or more closest food items, the weight of its additional time may be proportion to the determined proximity of its food item vector to the detected vector in the multi-dimensional feature Controller 202 then can control an action being taken, for example, by sending one or more signals to the motor 214 (e.g., via a switch connected to motor 214) to control the continuing of blending for the additional blending time, or stopping the motor, for example, if the additional blending time=0 seconds.

FIG. 2 is a block diagram of an electronic control system 200 of a food processor according to various implementations of the present disclosure. Control system 200 could represent an electronic control and/or processing system within a device such as, for example, a micro puree machine, a blender, an ice cream maker, an immersion blender, a stand mixer, or an attachment to any of such devices. Control system 200 may include a microcontroller, a processor, a system-on-a-chip (SoC), a client device, and/or a physical computing device and may include hardware and/or virtual processor(s). In some implementations, control system 200 and its elements as shown in FIG. 2 each relate to physical hardware and in some implementations one, more, or all of the elements could be implemented using emulators or virtual machines. Regardless, electronic control system 200 may be implemented on physical hardware, such as food processor 100.

As also shown in FIG. 2, control system 200 may include a user interface 212, having, for example, a keyboard, keypad, touchpad, or sensor readout (e.g., biometric scanner) and one or more output devices, such as displays, speakers for audio, LED indicators, and/or light indicators. Control system 200 may also include communications interfaces 210, such as a network communication unit that could include a wired communication component and/or a wireless communications component, which may be communicatively coupled to controller and/or processor 202. The network communication unit may utilize any of a variety of proprietary or standardized network protocols, such as Ethernet, TCP/IP, to name a few of many protocols, to effect communications between processor 202 and another device, network, or system. Network communication units may also comprise one or more transceivers that utilize the Ethernet, power line communication (PLC), Wi-Fi, cellular, and/or other communication methods.

Control system 200 may include a processing element, such as controller and/or processor 202, that contains one or more hardware processors, where each hardware processor may have a single or multiple processor cores. In one implementation, the processor 202 includes at least one shared cache that stores data (e.g., computing instructions) that are utilized by one or more other components of processor 202. For example, the shared cache may be a locally cached data stored in a memory for faster access by components of the processing elements that make up processor 202. Examples of processors include but are not limited to a central processing unit (CPU) and/or microprocessor. Controller and/or processor 202 may utilize a computer architecture base on, without limitation, the Intel® 8051 architecture, Motorola® 68HCX, Intel® 80X86, and the like. The processor 202 may include, without limitation, an 8-bit, 12-bit, 16-bit, 32-bit, or 64-bit architecture. Although not illustrated in FIG. 2, the processing elements that make up processor 202 may also include one or more other types of hardware processing components, such as graphics processing units (GPUs), application specific integrated circuits (ASICs), field-programmable gate arrays (FPGAs), and/or digital signal processors (DSPs).

FIG. 2 also illustrates that memory 204 may be operatively and communicatively coupled to controller 202. Memory 204 may be a non-transitory medium configured to store various types of data. For example, memory 204 may include one or more storage devices 208 that include a non-volatile storage device and/or volatile memory. Volatile memory, such as random-access memory (RAM), can be any suitable non-permanent storage device. The non-volatile storage devices 208 may include one or more disk drives, optical drives, solid-state drives (SSDs), tape drives, flash memory, read-only memory (ROM), and/or any other type memory designed to maintain data for a duration time after a power loss or shut down operation. In certain configurations, the non-volatile storage devices 208 may be used to store overflow data if allocated RAM is not large enough to hold all working data. The non-volatile storage devices 208 may also be used to store programs that are loaded into the RAM when such programs are selected for execution. Data store and/or storage devices 208 may be arranged to store a plurality of food processing instruction programs associated with a plurality of food processing sequences, i.e., recipes. Such food processing instruction programs may include instruction for controller and/or processor 202 to: start or stop one or motors 214 (e.g., such as the electrical motor 214 in base 104 of food processor 100, as shown in FIG. 1), operate the one or more motors 214 at certain periods during a particular food processing sequence, issue one or more cue instructions to user interface 212 that are output to a user to illicit a response, action, and/or input from the user.

Persons of ordinary skill in the art are aware that software programs may be developed, encoded, and compiled in a variety of computing languages for a variety of software platforms and/or operating systems and subsequently loaded and executed by processor 202. In one implementation, the compiling process of the software program may transform program code written in a programming language to another computer language such that the processor 202 is able to execute the programming code. For example, the compiling process of the software program may generate an executable program that provides encoded instructions (e.g., machine code instructions) for processor 202 to accomplish specific, non-generic, particular computing functions.

After the compiling process, the encoded instructions may be loaded as computer executable instructions or process steps to processor 202 from storage 208, from memory 204, and/or embedded within processor 202 (e.g., via a cache or on-board ROM). Processor 202 may be configured to execute the stored instructions or process steps in order to perform instructions or process steps to transform the electronic control system 200 into a non-generic, particular, specially programmed machine or apparatus. Stored data, e.g., data stored by a data store and/or storage device 208, may be accessed by processor 202 during the execution of computer executable instructions or process steps to instruct one or more components within control system 200 and/or other components or devices external to system 200.

User interface 212 can include a display, positional input device (such as a mouse, touchpad, touchscreen, or the like), keyboard, keypad, one or more buttons, or other forms of user input and output devices. The user interface components may be communicatively coupled to processor 202. When the user interface output device is or includes a display, the display can be implemented in various ways, including by a liquid crystal display (LCD) or a cathode-ray tube (CRT) or light emitting diode (LED) display, such as an OLED display.

Sensor(s) 206 may include one or more sensors that detect and/or monitor at least one property associated with the processing of one or more food items by system 100 and/or physical properties (i.e., environmental conditions) within or surrounding system 100 and/or 200, such as within or surrounding, for example, blending container or jar 108 of FIG. 1. A property associated with the processing of one or more food items and/or environmental conditions may include, without limitation, rotation, speed of rotation, and/or movement of a device or component (e.g., a motor), rate of such movement, frequency of such movement, direction of such movements, temperature, pressure, motor current, position of a device or component (e.g., whether a trap door or lid is open or closed), and/or the presence of a device or component (e.g., whether a lid is connected to, for example, blending jar 108 of FIG. 1). Types of sensors may include, for example, electrical metering chips, electrical current and/or voltage sensors, Hall sensors, inertial measurement units (IMUs), accelerometers, gyroscopes, pressure sensors, temperature sensors, cameras, other types of sensors, or any suitable combination of the foregoing.

Sensors 206 may also include one or more safety and/or interlock switches that prevent or enable operation of certain components, e.g., a motor, when certain conditions are met (e.g., enabling activation of motor 214 when lid 110 is attached to container 108). Persons of ordinary skill in the art are aware that electronic control system 200 may include other components well known in the art, such as power sources and/or analog-to-digital converters, not explicitly shown in FIG. 2.

In some implementations, control system 200 and/or processor 202 includes an SoC having multiple hardware components, including but not limited to:

a microcontroller, microprocessor or digital signal processor (DSP) core and/or multiprocessor SoCs (MP-SoC) having more than one processor cores;

memory blocks including a selection of read-only memory (ROM), random access memory (RAM), electronically erasable programmable read-only memory (EEPROM) and flash memory;

timing sources including oscillators and phase-docked loops;

peripherals including counter-timers, real-time timers and power-on reset generators;

external interfaces, including industry standards such as universal serial bus (USB), FireWire, Ethernet, universal synchronous/asynchronous receiver/transmitter (USART), serial peripheral interface (SPI);

analog interfaces including analog-to-digital converters (ADCs) and digital-to-analog converters (DACs); and voltage regulators and power management circuits.

A SoC includes both the hardware, described above, and software controlling the microcontroller, microprocessor and/or DSP cores, peripherals and interfaces. Most SoCs are developed from pre-qualified hardware blocks for the hardware elements (e.g., referred to as modules or components which represent an IP core or IP block), together with software drivers that control their operation. The above listing of hardware elements is not exhaustive. A SoC may include protocol stacks that drive industry-standard interfaces like a universal serial bus (USB).

Once the overall architecture of the SoC has been defined, individual hardware elements may be described in an abstract language called RTL which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as Institute of Electrical and Electronic Engineers (IEEE) 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. In some implementations, various components of control system 200 are implemented on a printed circuit board (PCB).

Figure 3:
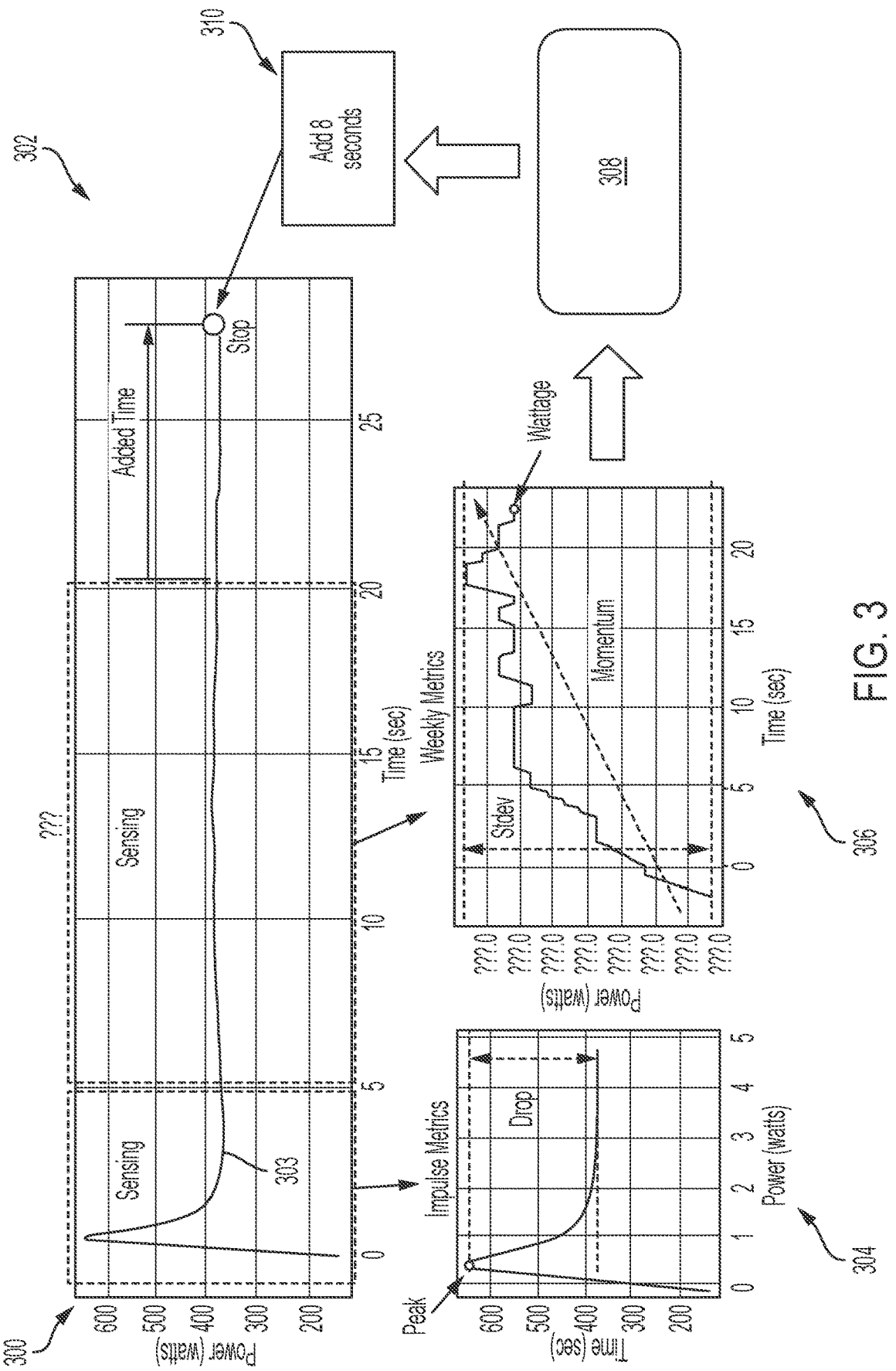
FIG. 3 is a diagram showing an example of a workflow of processes within the food processor of FIG. 1, according to some implementations.

FIG. 3 is a diagram showing an example of a workflow 300 of processes implemented by controller and/or processor 202 within the food processor 100 of FIG. 1. Workflow 300 involves processing detected values of physical property values associated with processing of a food item such as, for example, current and voltage of motor 214, i.e., detection signals, over a period of time during processing of a food item, and taking one or more actions as a result of such processing. In some implementations, one or more actions include adding processing time and/or adjusting the power supplied to the controllable component, e.g., motor. The controller 202 can monitor the power consumption of motor 214; e.g., detect current and/or voltage, during a blend cycle over an initial period (e.g., an initial 15-second period) via sensor(s) 206, and generate time series data (e.g. power values), from these detected values, which can be visually represented as illustrated by graph 302. In graphs 302, 304 and 306, the horizontal axis represents time and the vertical axis represents power consumption.

The time series power values form a curve 303. A time=0 is the motor is initially energized—i.e., electrical current is provided to the motor. As illustrated, the power initially spikes from 0 watts to over 600 watts. This initial spike is a manifestation of a phenomena called "inrush current", also referred to as "locked rotor current." Inrush current is the excessive current flow experienced within a motor and its conductors during the first few moments following the energizing (switching on) of the motor. The peak value of this spike, the time it takes to reach the peak value, and the rate at which the power consumption reaches and recedes from this peak value all may be impacted by the load the food item imposes on the motor. As such, the peak value of this spike, which is also the peak value of the entire curve 303, the time it takes to reach the peak value, and the rate at which the power consumption reaches and recedes from this peak value, may be indicative of the type of food being processed. Graph 304 illustrates a subset of the curve 303 of time series property values, from 0-5 seconds. Graph 302 illustrates a subset of the curve 303 of time series property values, from around 5 seconds through about 15 seconds, in which only a subset of the vertical axis is shown, representing a sub-range of the power consumption values shown in graph 302 and 304.

As illustrated in graphs 304 and 306 of FIG. 3, controller 202 can generate feature values from the time series power values illustrated by curve 303, including, but not limited to: a peak power consumption value ("Peak") in the time series power values of graph 302; a difference ("Drop") between the Peak and the power consumption at a particular point in time (e.g., at which the power consumption appears to have recovered from the initial inrush current-induced spike); a standard deviation ("Stdev") of the power consumption for a sub-period of the time period (e.g., 5 seconds-15 seconds) covered by the time series power values; power consumption ("Wattage") at a particular time within the time period (e.g., 15 seconds) represented by the time series power values; momentum of the power consumption (e.g., slope of the curve 303) over a sub-period of the time period represented by the time series power values, a gradient of the curve of the time series power values over a sub-period of the time period; and/or other feature values.

The time period of detection, features for which values are determined, and the particular times and sub-periods for which these feature values are determined, may vary, and are not limited to those illustrated and described herein. In some implementations, these parameters and their values are selected based on testing and empirical data from which the parameters that are optimal for generating feature values to distinguish between food items can be determined.

In some implementations, controller 202 and/or food analyzer 308 can classify the processed food item based on one or more of the feature values determined from the time series data, e.g., the time series property values, for example if one or more food items derived from ingredients 106 includes a nut-butter. Food analyzer 308 may be implemented as a software program or function, hardware function, firmware functions, or a combination thereof. In some implementations, controller 202 implements food analyzer 308 as computer-implemented program, function, and/or routine. This classification can occur via one or more neural networks, such as a multi-layer perception (MLP) classifier. In some implementations, this classification can include classifying the one or more food items derived from ingredients 106 as nut-butter or another thicker food type. Determining certain properties/features of one or more food items being processed, as illustrated in graphs 302, 304, and 306, can further include controller and/or processor 202 first sensing, for example, the food processor container type, size, or other related attributes. This data can provide classification and/or categorization information, which can aid controller 202 and/or processor in assigning one or more actions to accommodate the relevant component. For example, controller 202 may instruct motor 214 to perform differently depending upon the size of the blending container 108. For example, these actions and/or performances may include controller 202 directing more or less current and/or power to motor 214, directing more or less current and/or power to a heating element, directing different drive shaft rotation speeds, and/or adjusting an amount of time or periods when the motor is rotating.

As shown in FIG. 3, a calculation of various (e.g., 1, 2, 3, 4, 5, or more) features can be performed based on the detected time-series patterns illustrated in graphs 302, 304, and/or 306 to provide signals comprising a set of feature values. This can allow for the subsequent performance of a nearest neighbor analysis via, for example, a KNN analysis. Each of these time-series pattern conditions/properties/features may include a peak in a plot of the pattern, a drop in a plot of the pattern, a standard deviation of a plot of the pattern, and/or a steady state power consumption in a plot of the pattern, as detailed above. Again, these conditions, properties, and/or features which can allow for the example processes, can include one or more: mean(s) and/or averages, including the mean wattage to be taken over a specific time period; standard(s), including the standard deviation of the wattage to be taken over a specific time period (shown in graph 306); momentum(s), including the slope of the wattage to be taken over a specific time period (shown in graph 306); max(es), including the maximum wattage of the data recorded (shown in graph 306); and drop(s), including percent drop from the max to steady wattage (shown in graph 304). These time periods, and the definition of steady wattage, can be informed by and/or formatted to apply to several contexts, such as United State engineering standards.

Figure 4:
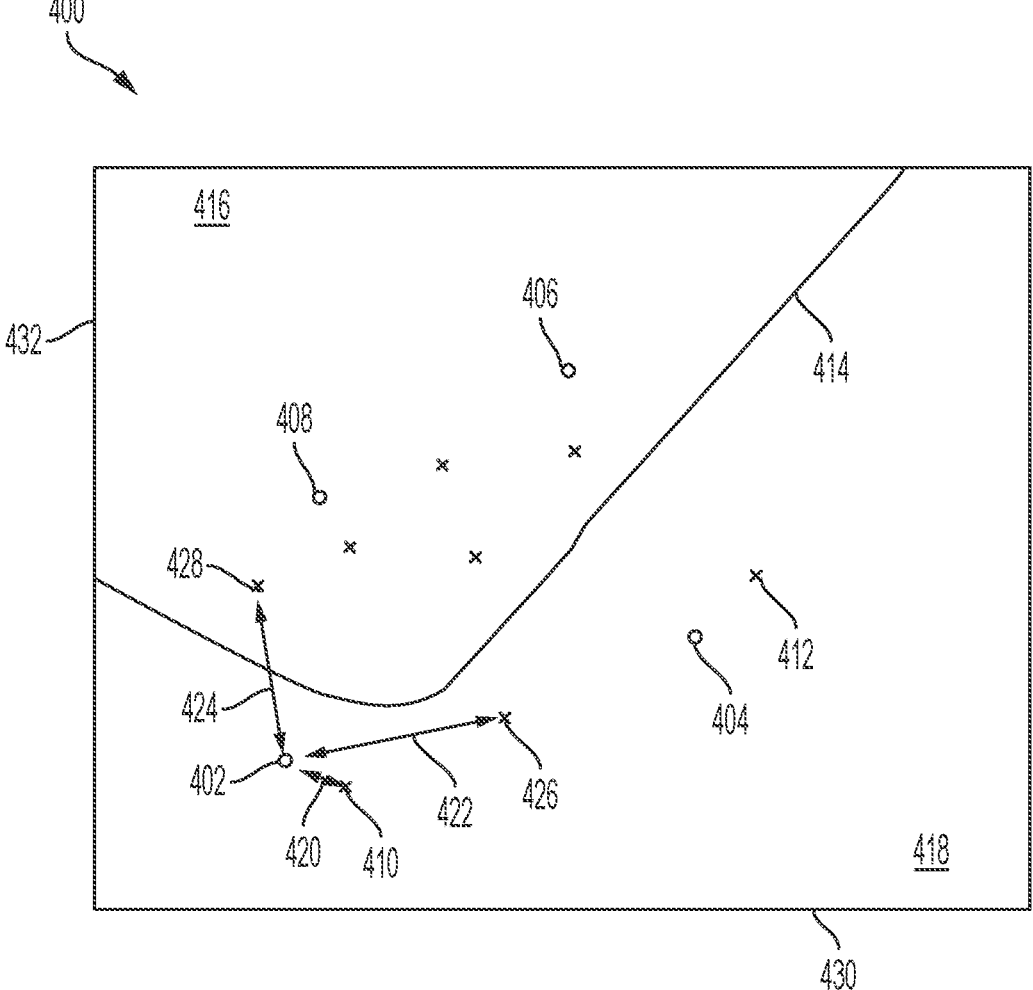
FIG. 4 is a graph showing an example of a multi-dimensional feature space for food items, according to some implementations.

This set of feature values, which can be determined via the detected time series data and/or patterns shown in graphs 302, 304, and 306 of FIG. 3 can subsequently serve as inputs to food type analyzer 308 as one or more detection vectors. Additionally, certain properties/features of one or more food items being processed in a multi-dimensional feature space, as detailed in graphs 302, 304, and 306, can further include controller and/or processor 202 first determining, for example, one or more food item details, such as associated features, vectors, and/or other related attributes. For example, a multi-dimensional feature space can include two-dimensional, as shown in FIG. 4, three-dimensional, and/or four-dimensional parameters, or higher dimensional parameters. The feature values/detection vector can provide food type information based on a determination of the closest food type in the multi-dimensional feature space. For example, controller 202 and/or food type analyzer 308 can select one or more data sets of multi-dimensional feature vectors stored in memory 204 based on the determined capacity of the blending jar 108. In other instances, the selected one or more data sets of multi-dimensional feature vectors stored in memory 204 may be based on other factors and/or properties relating to food processor 100 and/or blending jar 108. This data can provide classification and/or categorization information, which can aid controller and/or processor 202 in assigning one or more data sets and/or subsequent actions to accommodate the associated one or more food items in, for example, blending container 108.

As shown in FIG. 3, controller 202 and/or food type analyzer 308 can compare the detection vector generated from the time series data against the selected data set of food item vectors in the multi-dimensional feature space. In some instances, each food item vector represents and/or is associated with a food type. For example, controller 202 may instruct motor 214 to perform differently depending upon information from the predetermined food item vector, including data set, relating to blending performance within blending container 108. This may include, for example, optimizing blending time and/or speed to best blend one or more different food items according to instructions provided by the predetermined food item vector. For example, a determination of a margarita vector may result in an addition of X amount of extra blending time, whereas a determination of a tropical smoothie vector may result in an addition of Y amount of extra blending time. Food type analyzer 308 may include software, hardware, or a combination therefore that may implement one or more routines and/or algorithms to analyze the time series data shown in graphs 302, 304, and 305, and detect and/or identify a food item. Food type analyzer 308 may be implemented as part of control system 200 and/or processor 202. For example, the previously provided detection vector/feature values from the time series data can be represented as variables a, b, c, d, e, e.g., as coordinates for each data point, with each row representing a data point. The number of columns can be equal to the number of detection vector/feature values from the time series pattern being measured, and the number of rows can be equal to the number of data points:

$$\begin{bmatrix} a_1 & \cdots & e_1 \\ \vdots & \ddots & \vdots \\ a_n & \cdots & e_n \end{bmatrix}$$

In some implementations, the following array holds the program time ($t_i$) associated with each data point (e.g., time to be added), with the same number of rows as the above data array:

$$\begin{bmatrix} t_1 \\ \vdots \\ t_n \end{bmatrix}$$

According to FIG. 3, once food type analyzer 308 of example workflow 300 analyzes the detection vector/feature values from the time series pattern and determines what the input(s) to the food type analyzer 308 are going to be, it may need to scale the data for both accuracy of the food type analyzer 308 and efficiency of its functions and/or code. For example, with a goal to store data points, the input can be represented as int8_t data types to save memory. In some implementations, in order for a standard scaler to best perform machine learning, the data may need to be scaled between −128 and 127. This scaling can be done with the following equation according to United State engineering standards:

$$x_{scaled} = \frac{x - \mu}{s}$$

where x is the raw detection vector data, u is the mean value of the detection vector data, e.g., mean value of current or wattage, S is the standard deviation of the detection vector data, and $X_{scaled}$ is the scaled detection vector data.

In some implementations, scaling to use int8_t may not have a dramatic effect on the results of the food type analyzer 308; therefore, it may be important to ensure a new data point remains within the target range.

Additionally, in FIG. 3, once the example food processor has determined the input points following sensing the data of the detection vector/feature values from the time series data and/or pattern, a determination of the distance from the detection vector and each food item vector may need to be calculated. For example, a KNN analysis may be initiated to provide a determination of one or more positions of one or more nearest neighbors in the multi-dimensional feature space in comparison with that of the position of the detection vector. This can involve multiple distance metrics; for example, based on the initial analysis, and may use either Mikowski distance or Bray-Curtis distance, as presented below:

Bray-Curtis:

$$d_{BC} = \frac{\sum_{j=1}^{m} |x_j - y_j|}{\sum_{j=1}^{m} (|x_j + y_j|)}$$

Mikowski:

$$d_M = \sqrt[p]{\sum_{j=1}^{n} |x_j - y_J|^p}$$

where j=1, m=number of iterations, $x_j$=Object A vector point first coordinate value, $y_j$=Object B vector point first coordinate value, p=order (via integer value) between two points, $d_{BC}$=Bray-Curtis distance, and $d_M$=Mikoswki distance. For Bray-Curtis, which can measure the distance between points A and B, if all coordinates are positive, its value is between 0 and 1. If both Objects are in the 0 coordinates, such as (0,0), however, the Bray-Curtis distance may be undefined. The normalization can be done using the absolute difference divided by the summation. For p≥1, the Minkowski distance is a metric as a result of the Minkowski inequality. When p<1, the distance between (0,0) and (1,1) is $2^{1/p}$>2, but the point (0,1) is at a distance 1 from both of these points. Since this violates the triangle inequality, for p<1, it is not a metric. However, a metric can be obtained for these values by simply removing the exponent of 1/p. The resulting metric is also an F-norm.

According to the example implementation of FIG. 3, once the k closest neighbors have been determined, a program and/or routine of food type analyzer 308 determines its output as an action. For each determined one or more closest food types, as previously introduced, a determination of extra time for blending may be dictated. This extra time can be specified in the feature vector for the food type based on the stored multi-dimensional feature vector data. As mentioned, each datapoint may have a time associated with it, necessitating a determination of what time it will output based on, for example, a weighted average combining each of the extra times to produce the total time to be added to the blending process. For example, in FIG. 3, this includes a weighted average determination 310 of 8 additional seconds of time to be added to the blending process. Like the distance measurement, there are several different weight functions that can be used, such as:

$$w = \frac{1}{d^z}$$

where d=distance between two Objects/vector points, z=number of distance calculations between two respective Objects/vector points, and w=weight. At this time, the output from food type analyzer 308 is returned and represented in the easternmost region of graph 302 of workflow 300, illustrated as "Added Time.".

In some implementations, a special sensor chip can sample, detect, and/or monitor power by sampling the voltage on a terminal/lead of the motor. A controller, such as controller and/or processor 202 of FIG. 2, and/or food type analyzer 308 can thereby acquire this sampled voltage value from sensor (2) 206, e.g., a sensor chip, analyze the data, and based on this analysis, act by sending a control signal to and/or signaling a TRIAC switch that controls power input to blender motor 214. The output signaling of the TRAIC switch (or another type of switch or control mechanism) can stop, start, increase or decrease the motor speed based on the control signal and/or signaling from processor 202 and/or food type analyzer 308. That is, the analysis described herein can also include identifying one or more recipes associated with individual or aggregated food items within the blending container 108, and when the nearest one or more recipes are identified, adding blend time per the determined one or more nearest recipes, as shown in control step 310 of FIG. 3.

FIG. 4 shows an illustrative multi-dimensional feature space 400, containing vector points representing food item vectors such as vector points 410, 412, 426, and 428, for example, determined by food type analyzer 308 of FIG. 3. Specifically, for illustrative purposes, the feature space 400 is a two-dimensional feature space, where the horizontal axis 430 represents a value of a first feature and the vertical axis 432 represents a value of a second feature. In some implementations, some of the vector points in feature space 400 represent detection vectors determined by workflow 300 of FIG. 3 via controller 202 and/or food type analyzer 308. For example, feature space 400 can include detection vectors 402, 404, 406 and 408, represented as points in the feature space 400.

A nearest neighbor analysis, which may be similar or different to the KNN analysis discussed in FIG. 3, can be performed based on the closest one or more food items (e.g., two types of smoothie) to the currently detected food item. In some implementations, controller 202 classifies a first subset of food item vectors as a first category of food items, e.g., nut butters, and controls the controllable component, e.g., motor 214, based at least in part on determining that the position of the detection vector, e.g. detection vector point 408, is within a first area 416 of the multi-dimensional feature space 400 associated with the first category of food items, e.g., nut butters. For example, various types of nut butter may be members of the first subset of food item vectors and, therefore, have their food item vectors, such as vector point 428, in the first area 416 of the multi-dimensional feature space 400, while non-nut butter food items may be members of a second subset of food items and, therefore, have their food item vectors (e.g., vector points 410, 426, and 412) in a second area 418 of the multi-dimensional feature space 400. The first area 416 and second area 418 may be separated by a boundary 414. In some implementations, the multi-dimensional feature space 400 may include three or more areas associated with three or more categories of food items.

FIG. 4 illustrates the two-dimensional spatial relationship among food item vectors and detection vectors. For example, detection vector 402 is spaced away from food item vector 410 by distance 420, spaced away from food item vector 426 by distance 422, and spaced away from food item vector 428 by distance 424. If, for example, food item vector 410 is associated with a margarita drink, then detection vector 402 may be identified as a vector associated with a margarita drink based on distance 420 being the shortest distance, i.e., based on food item vector 410 being the closest food item vector to detection vector 402. But in some implementations, controller 202 and/or analyzer 308 may use distances from detection vector 402 to multiple food item vectors to identify a food item associated with detection vector 402. Controller 202 may identify the food item associated with detection vector 402 based on the two closest food item vectors, based on the three closest food item vectors, or more food item vectors. Where two distances are similar, e.g., distances 422 and 424, controller 202 may consider a third distance 420 additionally or alternatively to identify the food item associated with the detection vector such as detection vector 402.

In some implementations, controller 202 identifies one or more types of food items associated with a detection vector by determining a position of the detection vector, e.g., detection vector 402, in the multi-dimensional feature space 400 relative to positions of some or all of food item vectors (e.g., food item vectors 410, 412, 426, and 428), respectively, in the multi-dimensional feature space 400. Controller 202 may determine one or more actions based at least in part on the identified one or more types of food items. Controller 202 may control an operation of a controllable component, e.g., motor 214, based at least in part on the determined one or more actions. In some implementations, controller 202 determines one or more actions based at least in part on the area, e.g., area 416 or area 418, where a detection vector is located in the feature space 400. For example, detection vector 406 is located in area 416 which may be associated with a nut butter group or subset of food items, while detection vector 402 is located in area 418 which may be associated with a non-nut butter and/or drink group or subset of food items. Controller 202 may control an operation of a controllable component, e.g., motor 214, based at least in part on the determined one or more actions associated with a group or subset of food items.

In one implementation, a microcontroller and/or microprocessor, such as controller and/or processor 202, receives a series of signals from motor 214 from one or more sensors, such as sensor 206. Processor 202, via food type analyzer 308, determines a power consumption timeseries pattern of the motor 214 over the first time period. Processor 202 identifies a plurality of timeseries pattern features associated with the timeseries pattern and then calculates a detection vector, e.g., detection vector 402, based on the plurality of time-series pattern features. Depending upon the underlying feature values from the time series which result in detection vector 402, an initial classification of food type, such as nut butter in area 416 or drink in area 418, can include an MLP classification resulting in a KNN or non-KNN analysis. These classification events can aggregate over time to more effectively and efficiently inform additional classifications. Controller 202 and/or food type analyzer 308 compares a position of the detection vector 402 with the positions of some or all of the plurality of food item vectors in the multi-dimensional feature space 400. Controller 202 and/or food type analyzer 308 identifies the food item associated with detection vector 402 by determining which one of the plurality of food item vectors is closest to detection vector 402 in the multi-dimensional feature space 400, such as food item vector 410 at distance 420 from detection vector 402. If food item vector 410 is associated with a smoothie, controller 202 and/or food type analyzer 308 determines that food item being processed is a smoothie. Controller 202 may then determine how much longer motor 214 and mixing blades should rotate, e.g., a second period of time. In one implementations, controller 202 determines the second time period based on one or more of the closest food item vectors such as, for example, food item vectors 410, 412, 424, and/or 426. In some implementations, controller 202 determines the second time period based on a combined weighted average of extra time depending upon one or more determinations associated with each of the food item vectors being used to identify the detection vector (e.g., food item vectors 410, 412, 426, and 428), until motor 214 is stopped to realize a more accurate and/or consistent smoothie.

In another instance, controller 202 and/or food type analyzer 308 receives a series of motor 214 signals from one or more sensors, such as sensor 206. Controller 202, via food type analyzer 308, determines a power consumption timeseries pattern and/or data set of the motor 214 over the first time period. Controller 202 identifies a plurality of timeseries pattern features associated with the time-series pattern and then calculates a detection vector, e.g., detection vector 404, based on the plurality of time-series pattern features. In some implementations, calculating a detection vector includes determining a time series pattern from the detected signals, with the time series pattern including a gradient of power curve, e.g., curve 303. Controller 202 and/or food type analyzer 308 compares a position of the detection vector 404 with the positions of the plurality of known food item vectors in the multi-dimensional feature space 400. Controller 202 and/or food type analyzer 308 identifies the type of food item associated with detection vector 404 by determining which one of the first plurality of food item vectors is closest to detection vector 404 in the multi-dimensional feature space 400. In this instance, the closest know food item vector is vector 412. If known food item vector 412 is associated with whip cream, controller 202 and/or food type analyzer 308 determines that food item being processed is whip cream. The processor 202 may then determine how much longer motor 214 and mixing blades should rotate, e.g., a second period of time, until motor 214 is stopped to realize a more accurate and/or consistent whip cream.

In some implementations, an additional series of motor signals corresponding to processing a food item can be detected to more accurately identify and/or confirm the type of food item being processed. For example, after controller 202 classifies a type and/or first subset of food item vectors, as a nut butter, one or more sensors, such as sensor 206, may continue sensing for an additional period of time, e.g., 15 seconds, and provide an additional series of motor 214 signals to controller 202 and/or food type analyzer 308. Based on analyzing this additional series of motor signals, controller 202 may operate motor 214 to rotate the mixing blades of blade assembly 102 for an additional period of time. These additional series of motor 214 signals may include a power consumption and/or motor current trend over multiple increments or periods of time, such as over multiple 100 ms time segments, that are output from sensor 206 and analyzed by controller 202 and/or food type analyzer 308. Based on its analysis, controller 202 and/or food type analyzer 308 may determine and/or confirm the identity and/or classification of a food item and, thereby, determine that additional processing of the food item is necessary. This determination may be based on, for example, if the power consumption trend of motor 214 as detected every 100 ms trends in an increasing or decreasing direction or is greater than or equal to a threshold rate of increase or decrease, or is greater than or equal to a threshold increase from a minimum recorded value.

FIG. 7 show a graph 700 that illustrates detected increasing trends of power load detected with respect to motor 214 via, for example, sensor 206, that controller 202 can analyze to confirm that a food item being processed is or is not a particular classification of food item, e.g., a type of nut butter. Such additional sensing of motor power and/or current reduces the possibility of a misclassification of a type of food item, such as for example, a nut butter. When the power consumption and/or current trend of motor 214 over a period of time is no longer greater than or equal to a set threshold, controller 202 and/or food type analyzer 308 may determine processing of the food item is no longer required.

In some instances, in FIG. 4, when controller 202 detects at least one property associated with the processing of the one or more food items, such as a food item derived from ingredients 106, controller 202 also determines a type and/or size of the one or more components, such as blending jar 108. In this way, controller 202 may more efficiently or readily identify a food item based on understanding that certain types of food items are most often or only processed using certain types of components and/or containers. In some implementations, controller 202 is configured to classify the one or more food items, such as a food item in nut butter area 416, based on the detection vector, such as detection vector 406 or 408 and by detecting the type of jar 108 being used to create the food item associated with detection vector 406 or 408. In some implementations, controller 202 can be configured to control motor 214 based solely on the type and/or size of one of the components, such as blending jar 108, based on a recognition that certain types of food items use certain types of components and/or containers when being processed.

In some implementations, controller 202 is configured to identify one or more types of food items, such as a type of nut butter associated with detection vector 408 and a type of frozen drink associated with detection vector 402, based on applying a weight factor to some or all of the food item vectors in feature space 400, such as food item vectors 410 and 412. In some implementations the weight factor is based on at least one of: a distance of a food item vector from the detection vector, a type of food item associated with a food item vector, a frequency of determining a type of food item, and a type of container used during food processing, within multi-dimensional feature space 400. For example, a weight factor can be measured and/or assigned on a scale of 0.0-1.0, or any other reasonable weighted scaled metric, that may be used to adjust a value of one or more features of a food item vector and/or shift the position of a food item vector in the multi-dimensional feature space 400, to effect identification of the type of food item by controller 202. In some implementations, each of the food item vectors can be associated with a known type of food item such as food item vector 410 which may be associated with a margarita drink. Further, some or all of the food item vectors may be used by controller 202 to identify a food item associated with a detection vector. As previously discussed, a first plurality of food items vectors can be based on retrieving data related to the one or more food items (e.g., food item vectors 410, 426, and 428), that, based on the one or more components, can be used to identify a food item associated with a particular detection vector (e.g., detection vector 402) as being associated with a margarita drink) in order to determine blending conditions, such as time period of blending by operating motor 214, speed of motor 214 at certain time periods, temperature of a food item at certain times and/or periods, pressure in a blending and/or mixing chamber such as jar 108, and so on. Each food item vector can define values for multiple features.

FIG. 5 is flowchart showing an example process 500 for monitoring, analyzing, and performing one or more actions within the food processor of FIG. 1. Process 500 can include processing one or more food items, involving rotating, via a motor, one or more components (Step 502). For example, this can include rotating, via a motor, a draft shaft coupled to a blade assembly. The motor, drive shaft, and blade assembly can be similar to those introduced in FIG. 1, such as motor 214, drive shaft 116, and blade assembly 102, respectively. Process 500 can also include processing one or more food items, such as a food item derived from ingredients 106, in blending container and/or jar 108 while the blade assembly 102 is being rotated by the drive shaft 116 (Step 504). Process 500 can further include detecting at least one property associated with the processing of the one or more food items during a first period of time (Step 506). A first series of detection signals can be generated from the at least one property detected over the first period of time. For example, a first series of detection signals can include at least one of a current and voltage, via sensor(s) 208, associated with operation of motor 214 over a first time period. Process 500 can also include storing, in a memory, a first plurality of food item vectors, such as food item vectors 410, 412, 426, and 428 of FIG. 4 (Step 508). Each food item vector can define values for a plurality of features in a multi-dimensional feature space such as feature space 400. Accordingly, each of a first plurality of food item vectors, e.g., food item vectors 410 and 420, can be associated with a type of food item. For example, food item vector 410 may be associated with a margarita drink, while food item vector 412 may be associated with whipped cream. A first series of motor signals corresponding to at least one property of a food item can be processed to generate a detection vector such as detection vector 402. A plurality of known food item vectors (e.g., 410, 412, 426, and 428) can then be stored in a memory 204 and storage 208 of system 200 (Step 508). Controller 202 may classify a first subset of the food item vectors as a first category of food items (e.g., nut butter or drink) and control the controllable component, e.g., motor 214, based on determining that the position of the detection vector, e.g., detection vector 402, is within area 418 of the multi-dimensional feature space 400 which is associated with particular subset, group, and/or category of food items, e.g., food drink items. Any of steps 502-510 may be performed by a microcontroller and/or microprocessor, such as controller 202 of FIG. 2.

FIG. 6 shows a process 600 for identifying a type of food item and controlling operations of a controllable component based on the identification of the particular food item during processing of the food item. Process 600 includes operating a controllable component, by a controller 202, for a first period of time (Step 602). The controllable component may include a motor such as motor 214 that is arranged to rotate a drive shaft 102 and blade assembly 116 to mix ingredients 106. The controllable component may include a heater or heating element within or adjacent to jar 108 that is arranged to heat a food item being processed. The controllable component may include a pump and/or valve arranged to adjust a pressure within jar 108 when a food item is being processed. The controllable component may include any device or component configured to affect a physical property of a food item during processing.

Process 600 also includes detecting, via a monitoring device such as sensor(s) 206, at least one property associated with the processing of one or more food items during a first period of time, where a first series of detection signals are generated from the at least one property detected over the first period of time (Step 604). Process 600 includes storing, in a memory such as memory 204 and/or data storage 208, a plurality of food item vectors (e.g., food item vectors 410, 412, 426, and 428), where each food item vector defines values for a plurality of features in a multi-dimensional feature space 400, such that each of the plurality of food item vectors is associated with a type of food item (Step 606). Then, calculating, by controller 202 and/or food item analyzer 308, a detection vector, e.g., detection vector 402, based on the series of detection signals, where the detection vector defines feature values for a plurality of features in the multi-dimensional feature space 400 (Step 608). Controller 202 and/or food item analyzer 308 identifies one or more types of food items associated with the detection vector, e.g., detection vector 402, by determining a position of the detection vector in the multi-dimensional feature space relative to positions of one or more of a plurality of food item vectors (e.g., food item vectors 410, 426, and 428), respectively, in the multi-dimensional feature space (400) (Step 610). For example, food item vector 410 may be associated with a margarita drink. Food item vectors 426 may be associated with another type of frozen drink, while food item vector 428 may be associated with a peanut butter.

In one implementation, controller 202 may determine that detection vector 402 is associated with a margarita drink based on food item vector 410 being closest to detection vector 402. Controller 202 may identify the type of food item associated with detection vector 402 based on the position of detection vector 402 in relation to one or more of the known food item vectors in feature space 400. Controller 202 and/or food item analyzer 308 may then determine one or more actions based at least in part on the identified one or more types of food items (Step 612). Controller 202 may control operations of the controllable component, e.g., motor 214, based at least in part on the determined one or more actions. For example, the one or more actions may include controller 202 continuing to operate the controllable component for a second period of time based on the identified one or more types of food items. Controller 202 and/or analyzer 308 may identify a food item based at least in part on performing a K-NN analysis. Controller 202 may determine a how much longer motor 214 and one or more components, such as mixing blades, should rotate, e.g., a second period of time, until motor 214 is stopped to realize a more accurate and/or consistent smoothie.

In some implementations, the second period of time is between 0 seconds and 30 seconds. In some implementations, the second period of time is 15 seconds. In some implementations, the first period of time is 15 seconds. Further, identifying the food item can be based, at least in part, on a K-NN classification. Further, calculating a detection vector can include determining a time series pattern from the detection signals, where the time series pattern includes a gradient of power curve. In some implementations, the type of food item identified via processes 500 and 600 includes one of a apple-peanut-butter smoothie, beat-ginger-smoothie, chocolate-peanut-butter-oat, maple-almond-butter, cinnamon-coffee-smoothie, citrus smoothie, essentially green smoothie, triple-green smoothie, tropical smoothie, smoothie of any type, extract, sauce, ice cream, pudding, nut butter, whip cream, margarita, pomegranate-cashew berry, strawberry-banana, strawberry-limeade, and a frozen drink.

Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A blender comprising:
a controllable component coupled to one or more components configured to process one or more food items, wherein the controllable component comprises a motor;
a monitoring device configured to detect at least one property associated with the processing of the one or more food items during a first period of time, wherein a first series of detection signals are generated from the at least one property detected over the first period of time, and wherein the first series of detection signals comprises a time series of values of power consumption of the motor while processing of the one or more food items during the first period of time;
a memory configured to store a first plurality of food item vectors, each food item vector defining values for a plurality of features in a multi-dimensional feature space, each of the first plurality of food item vectors being associated with a type of food item; and
a controller, configured to control operations of the controllable component, is further configured to:
receive the time series of values of power consumption of the motor;
calculate a detection vector based on the time series of values of power consumption of the motor, the detection vector defining feature values for a plurality of features in the multi-dimensional feature space;
in response to calculating the detection vector, identify one or more types of food items associated with the detection vector, wherein, when identifying the one or more types of food items associated with the detection vector, the controller is configured to:
determine a location of the detection vector in the multi-dimensional feature space relative to positions of one or more of the first plurality of food item vectors, respectively, in the multi-dimensional feature space
compare the location of the detection vector with a location of one or more of the first plurality of food item vectors within a multi-dimensional feature space; and
determine one or more food item vectors of the plurality of food item vectors that are closest to the detection vector in the multi-dimensional feature space, wherein the one or more food item vectors corresponds to the one or more types of food items;
in response to identifying the one or more types of food items:
determine one or more actions based at least in part on the one or more types of food items; and
determine a second period of time based on the location of one or more of the first plurality of food item vectors with respect to the detection vector; and
control operation of the controllable component based at least in part on the-one or more actions, wherein, when controlling operation of the controllable component, the controller is configured to:

operate the controllable component for the second period of time based on the one or more types of food items.

2. The blender of claim 1, wherein the controllable component includes the motor and the operating the motor includes rotating the motor.

3. The blender of claim 1, wherein the identifying of the food item includes performing a K-NN analysis.

4. The blender of claim 1, wherein the monitoring device includes at least one of a current sensor, voltage sensor, motor speed sensor, pressure sensor, and temperature sensor.

5. The blender of claim 1, wherein calculating the detection vector includes calculating one or more feature values defining the detection vector, and wherein a first of the one or more feature values is a gradient of a curve defined by the first series of detection signals.

6. The blender of claim 1, wherein detecting the at least one property associated with the processing of the one or more food items during the first period of time includes detecting at least one of a current or voltage associated with operation of the controllable component over the first period of time.

7. The blender of claim 1, wherein detecting at least one property associated with the processing of the one or more food items includes determining a type and/or size of the one or more components, and wherein the controller is configured to control the controllable component based at least in part on the type and/or size of one of the components.

8. The blender of claim 1, wherein the controller is further configured to identify the one or more types of food items associated with the detection vector by determining the position of the detection vector in the multi-dimensional feature space with respect to positions of two or more of the first plurality of food item vectors in the multi-dimensional feature space.

9. The blender of claim 8, wherein the controller is configured to control the operation based on applying a weight factor to each of the two or more of the first plurality of food item vectors, the weight factor being based on at least one of a distance of a food item vector from the detection vector, a frequency of determining a type of food item, or a type of container used during food processing.

10. The blender of claim 1, wherein the controller is further configured to:

classify a first subset of the one or more food item vectors as a first category of food items; and control the controllable component based at least in part on determining that the position of the detection vector in the multi-dimensional feature space is within a first area of the multi-dimensional feature space associated with the first category of food items.

11. The blender of claim 10, wherein the controller is further configured to:

classify a second subset of the one or more food items vectors as a second category of food items; and control the controllable component based at least in part on determining that the position of the detection vector in the multi-dimensional feature space is within a second area of the multi-dimensional feature space associated with the second category of food items.

12. The blender of claim 1, wherein each of a feature values for a plurality of features in the multi-dimensional feature space are selected from a group including: a peak value detected for the at least one property in the first series of signals, a drop between values detected for the at least one property in the first series of signals, a standard deviation of values detected for the at least one property in the first series of signals, and a value detected for the at least one property at a particular point in time in the first series of signals.

13. The blender of claim 1, wherein, when operating the controllable component for the second period of time, the controller is configured to:

rotate the controllable component for the second period of time.

14. The blender of claim 13, wherein the second period of time is less than 30 seconds.

15. The blender of claim 1, wherein, when operating the controllable component for the second period of time, the controller is configured to:

rotate the motor for the second period of time; and stop rotating the motor after the second period of time expires.

16. A method for blending food items via a controllable component configured to process one or more food items comprising:

operating the controllable component for a first period of time, wherein the controllable component comprises a motor;

detecting, via a monitoring device, at least one property associated with the processing of the one or more food items during the first period of time, wherein a first series of detection signals are generated from the at least one property detected over the first period of time, and wherein the first series of detection signals comprises a time series of values of power consumption of the motor while processing of the one or more food items during the first period of time;

storing, in a memory, a first plurality of food item vectors, each food item vector defining values for a plurality of features in a multi-dimensional feature space, each of the first plurality of food item vectors being associated with a type of food item;

receiving the time series of values of power consumption of the motor;

calculating a detection vector based on the time series of values of power consumption of the motor, the detection vector defining feature values for a plurality of features in the multi-dimensional feature space;

in response to calculating the detection vector, identifying one or more types of food items associated with the detection vector, wherein identifying the one or more types of food items associated with the detection vector comprises:

determining a location of the detection vector in the multi-dimensional feature space relative to positions of one or more of the first plurality of food item vectors, respectively, in the multi-dimensional feature space;

comparing the location of the detection vector with a location of one or more of the first plurality of food item vectors within a multi-dimensional feature space; and determining one or more food item vectors of the plurality of food item vectors that are closest to the detection vector in the multi-dimensional feature space, wherein the one or more food item vectors corresponds to the one or more types of food items;

in response to identifying the one or more types of food items:

determining one or more actions based at least in part on the one or more types of food items; and determining a second period of time based on the location of one or more of the first plurality of food item vectors with respect to the detection vector; and controlling operation of the controllable component based at least in part on the one or more actions, wherein controlling operation of the controllable component comprises:

operating the controllable component for the second period of time based on the one or more types of food items based on the one or more types of food items.

17. The method of claim 16, wherein the controllable component includes the motor and operating the motor includes rotating the motor.

18. The method of claim 16, wherein the identifying of the food item includes performing a K-NN analysis.

19. The method of claim 16, comprising identifying the one or more types of food items associated with the detection vector by determining which one of the first plurality of food item vectors is closest to the detection vector in the multi-dimensional feature space.

20. A non-transitory computer-readable storage medium storing instructions including a plurality of food processing instructions associated with a food processing sequence which when executed by a computer cause the computer to perform a method for processing food items using a food processor via a controllable component configured to process one or more food items, the method comprising:

operating the controllable component for a first period of time, wherein the controllable component comprises a motor;

detecting, via a monitoring device, at least one property associated with the processing of the one or more food items during the first period of time, wherein a first series of detection signals are generated from the at least one property detected over the first period of time, and wherein the first series of detection signals comprises a time series of values of power consumption of the motor while processing of the one or more food items during the first period of time;

storing, in a memory, a first plurality of food item vectors, each food item vector defining values for a plurality of features in a multi-dimensional feature space, each of the first plurality of food item vectors being associated with a type of food item;

receiving the time series of values of power consumption of the motor;

calculating a detection vector based on the time series of values of power consumption of the motor, the detection vector defining feature values for a plurality of features in the multi-dimensional feature space;

identifying one or more types of food items associated with the detection vector, wherein identifying the one or more types of food items associated with the detection vector comprises:

determining a location of the detection vector in the multi-dimensional feature space relative to positions of one or more of the first plurality of food item vectors, respectively, in the multi-dimensional feature space;

comparing the location of the detection vector with a location of one or more of the first plurality of food item vectors within a multi-dimensional feature space; and determining one or more food item vectors of the plurality of food item vectors that are closest to the detection vector in the multi-dimensional feature space, wherein the one or more food item vectors corresponds to the one or more types of food items;

in response to identifying the one or more types of food items:

determining one or more actions based at least in part on the one or more types of food items; and determining a second period of time based on a location of one or more of the first plurality of food item vectors with respect to the detection vector; and controlling operation of the controllable component based at least in part on the one or more actions, wherein controlling operation of the controllable component comprises:

operating the controllable component for the second period of time based on the one or more types of food items.

* * * * *